(12) United States Patent
Uchiyama

(10) Patent No.: US 9,289,934 B2
(45) Date of Patent: Mar. 22, 2016

(54) CONTROL METHOD FOR INJECTION MOLDING MACHINE

(71) Applicant: FANUC Corporation, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/487,137

(22) Filed: Sep. 16, 2014

(65) Prior Publication Data
US 2015/0076736 A1 Mar. 19, 2015

(30) Foreign Application Priority Data

Sep. 17, 2013 (JP) ................... 2013-192390

(51) Int. Cl.
B29C 45/77 (2006.01)
B29C 45/00 (2006.01)

(52) U.S. Cl.
CPC ............. *B29C 45/77* (2013.01); *B29C 45/0025* (2013.01); *B29C 45/0046* (2013.01); *B29C 2045/0027* (2013.01); *B29C 2945/76498* (2013.01); *B29C 2945/76551* (2013.01); *B29C 2945/76568* (2013.01); *B29C 2945/76665* (2013.01); *B29C 2945/76678* (2013.01)

(58) Field of Classification Search
CPC .................. B29C 2045/508; B29C 2045/5096
See application file for complete search history.

(56) References Cited

U.S. PATENT DOCUMENTS

| 2001/0026031 A1* | 10/2001 | Onishi | ................ B29C 45/50 264/328.1 |
| 2001/0050446 A1* | 12/2001 | Konno | ................ B29C 45/76 264/40.1 |

FOREIGN PATENT DOCUMENTS

| JP | 63-288726 A | 11/1988 |
| JP | 4-65212 A | 3/1992 |
| JP | 5-245893 A | 9/1993 |
| JP | 7-299850 A | 11/1995 |
| JP | 2008-074114 A | 4/2008 |
| JP | 2013-59891 A | 4/2013 |

OTHER PUBLICATIONS

Office Action mailed Nov. 18, 2014, corresponding to Japanese patent application No. 2013-192390.

* cited by examiner

*Primary Examiner* — Jill Heitbrink
(74) *Attorney, Agent, or Firm* — Hauptman Ham, LLP

(57) ABSTRACT

In an injection process in which a screw or a plunger is advanced to inject a molten resin into a mold, the advance of the screw or the plunger is stopped and held just before a leading flow end of the resin reaches a gate portion, and the advance of the screw or the plunger is resumed for an injection operation after the passage of a predetermined period.

2 Claims, 2 Drawing Sheets

RESIN INLET

CONTROL METHOD FOR INJECTION MOLDING MACHINE

RELATED APPLICATIONS

The present application claims priority to Japanese Application Number 2013-192390, filed Sep. 17, 2013, the disclosure of which is hereby incorporated by reference herein in its entirety.

BACKGROUND OF THE INVENTION

1. Field of the Invention

The present invention relates to a control method for an injection molding machine, configured to produce molded products by feeding a resin into a heating cylinder, melting and measuring the fed resin in the heating cylinder, and injecting the measured molten resin into a mold mounted in a mold clamping device, and more particularly, to an advance control method for a screw or plunger for injecting the molten resin in the heating cylinder into the mold.

2. Description of the Related Art

In an injection process, a molten resin injected from a nozzle into a mold flows through a resin channel, including a sprue and runner, and finally reaches production sections, that is, cavities in which molded products are directly shaped. Gates are arranged between the resin channel and the production sections to separate them. Thus, the molten resin injected from the nozzle flows into the cavities, i.e., production sections 16, through a sprue 10, runner 12, and gates 14, as shown in FIG. 1. The sprue and runner portions will be collectively referred to as the "runner".

The resin channel in the mold comprises various parts with different shapes. Further, the molten resin is a viscoelastic body. Even if the resin is injected at a constant speed, therefore, the pressure on the resin does not constantly increase as the resin is filled into the mold, but sharply or slowly increases depending on the shapes of regions where the resin passes. Further, this pressure change causes the speed of passage of the resin through these regions, possibly resulting in molding failures.

The molding failures include flow marks, that is, traces of molten resin flows that appear as stripes around the gates, and so-called jetting such that the molten resin injected into the cavities through the gates is solidified in the shape of strings and produces meandering patterns on the surface of each molded product. These molding failures are mainly attributed to too high an inlet velocity of the molten resin that flows into the cavities or the production sections through the gates.

A method of preventing jetting is disclosed in Japanese Patent Application Laid-Open No. 7-299850. According to this method, a plunger is stopped from advancing for a set period of about 0.1 second at its set advanced position at the point in time when a runner is fully loaded or a gate portion is reached by the leading flow end of a molten resin, that is, the leading end of a flow of the molten resin injected and flowing into a mold. Thus, generation of peak pressure in the runner is suppressed so that jetting can be prevented.

According to the method described in Japanese Patent Application Laid-Open No. 7-299850, moreover, the position of a screw and the pressure in an injection cylinder are liable to variation for each molding cycle, so that it is difficult to reliably produce high-precision molded products. Thereupon, Japanese Patent Application Laid-Open No. 2008-74114 discloses a control method in which the screw is held short of a position where cavities are filled up with the resin and a packing process is started after the cavities are filled up.

In the method described in Japanese Patent Application Laid-Open No. 7-299850, the pressure on the molten resin in the runner is reduced by stopping the plunger for the set period at the position where the gate portion is reached by the leading flow end of the resin as the runner is filled up with the resin. Means for extruding the molten resin from a heating cylinder during an injection operation, including the plunger, is referred to as the screw. FIG. 2 is an explanatory diagram illustrating the relationship between the screw position during the injection operation and the leading flow end position of the molten resin of the prior art described above. In FIG. 2, the abscissa represents time, and the ordinate represents the position of the leading flow end of the molten resin along a resin distribution channel in the runner. Symbol P denotes the screw position; RP, the position of the leading flow end of the molten resin along the resin distribution channel in the runner; P1, a screw position at the start of injection; and RP1, a position of the leading flow end at an injection starting position. Symbol P2 denotes a screw advance stop position; T1, a screw advance stop time; T2, a screw advance restart time; and ST, a screw advance stop period. Symbol RP2 denotes a position where the leading flow end position RP of the molten resin that fills the runner reaches the gate portion. Symbol A represents a section where the molten resin is flowing into a runner portion, and symbol B represents a section where the molten resin is flowing into the cavities or the production sections.

At the start of injection, the screw starts to advance at the injection starting position P1. The starting point of a screw stroke is set on the tip side of the heating cylinder. On the other hand, the resin in the runner starts to move with a delay after the action of the screw, due to its elasticity and the like. Accordingly, the leading flow end RP of the molten resin starts to move with a slight delay and flows into the runner that serves as the resin distribution channel, as indicated by the section A. The screw advance is stopped at the time T1 for the position RP2 where the gate portion is reached by the leading end of the resin as the runner is filled up with the resin. Symbol P2 represents the screw position at this time T1. Thus, when the started screw advance is stopped at the time T1, the screw position is at P2, and the runner is filled up with the molten resin so that the gate portion position RP2 is reached by the leading flow end position RP. When the screw advance is stopped at the time T1, the runner is filled up with the compressed resin in an excessive volume.

When the screw advance is stopped, the pressure on the molten resin in the runner, that is, the pressure from the screw applied through the resin in the heating cylinder, is reduced, and the resin in the runner is released from compressive force and subjected to a lower pressure. Just after the screw advance is stopped, however, the pressure on the molten resin in the runner is high. Since a space in the runner communicates with the cavities or the production sections, the molten resin released from the compressive force increases its volume as it approaches the cavities through the gate portion. This expanded molten resin passing through the gates flows rapidly into the cavities. In FIG. 2, the section B represents a state in which the compressed molten resin is expanded and flows into the cavities or the production sections. Thus, the molten resin flows rapidly into the cavities while the screw advance is stopped. Thereafter, the screw advance is resumed for an injection operation at the time T2 for the passage of the set screw advance stop period ST.

The inlet velocity of the molten resin that flows into the cavities or the production sections through the gate portion can be kept lower according to the prior art method described in Japanese Patent Application Laid-Open No. 7-299850 than in the case where the resin is continuously injected from the runner portion with the screw advance stopped at a set position for a set period. Nevertheless, this conventional method cannot achieve the object to prevent the resin from flowing rapidly into the cavities or the production sections.

SUMMARY OF THE INVENTION

Accordingly, the object of the present invention is to provide a control method for an injection molding machine, capable of preventing the occurrence of molding failures, such as flow marks, jetting, etc., by controlling a molten resin not to flow too rapidly into cavities or production sections through a runner.

A control method for an injection molding machine according to the present invention is configured so that, in an injection process in which a screw or a plunger is advanced to inject a molten resin into a mold, the control method comprising; stopping the advance of the screw or the plunger just before a leading flow end of the resin reaches a gate portion and holding for a predetermined period: resuming the advance of the screw or the plunger for an injection operation A screw or plunger stop position where the advance of the screw or the plunger is stopped just before the leading flow end of the resin reaches the gate portion may be obtained as a position, where the leading flow end of the resin does not reach the gate portion when the application of an injection pressure is suspended at the moment when the screw or the plunger is stopped after being advanced from an injection starting position, and, where the leading flow end of the resin reaches the gate portion when the screw or the plunger is advanced from the injection starting position to the position concerned and stopped and the application of the injection pressure is suspended after retention for a predetermined period. Further, the predetermined period during which the advance of the screw or the plunger is stopped and held may be adjusted in obtaining the position where the leading flow of the resin reaches the gate portion, and the predetermined period may be obtained as a period in which the leading flow end of the resin reaches the gate portion and the resin is not solidified.

According to the present invention arranged in this manner, the advance of the screw or the plunger is stopped just before the leading flow end of the molten resin being injected reaches the gate portion, the compressed resin in a runner is expanded during the plunger is resumed, so that the resin can be prevented from flowing rapidly into cavities or production sections. In this way, the occurrence of molding failures, such as flow marks, jetting, etc., can be prevented.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
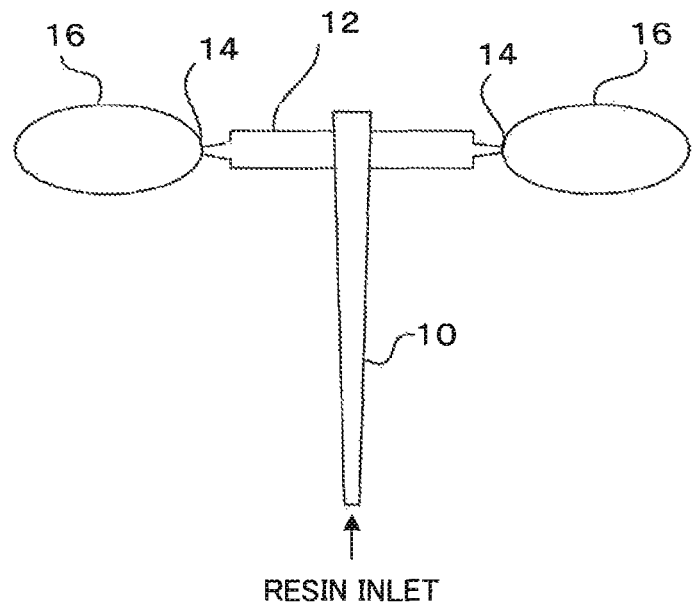
FIG. 1 is an explanatory diagram illustrating the relationships between a sprue, runner, gates, and cavities (production sections) of a mold.
Figure 2:
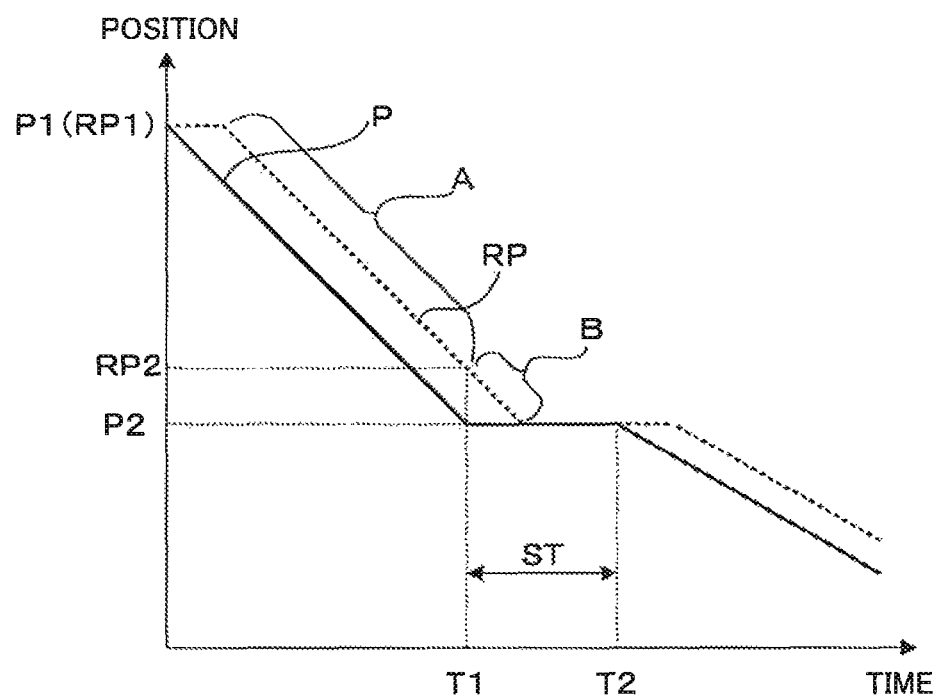
FIG. 2 is an explanatory diagram illustrating the relationship between the respective positions of a screw (or plunger) and the leading flow end of a molten resin in a conventional injection operation.
Figure 3:
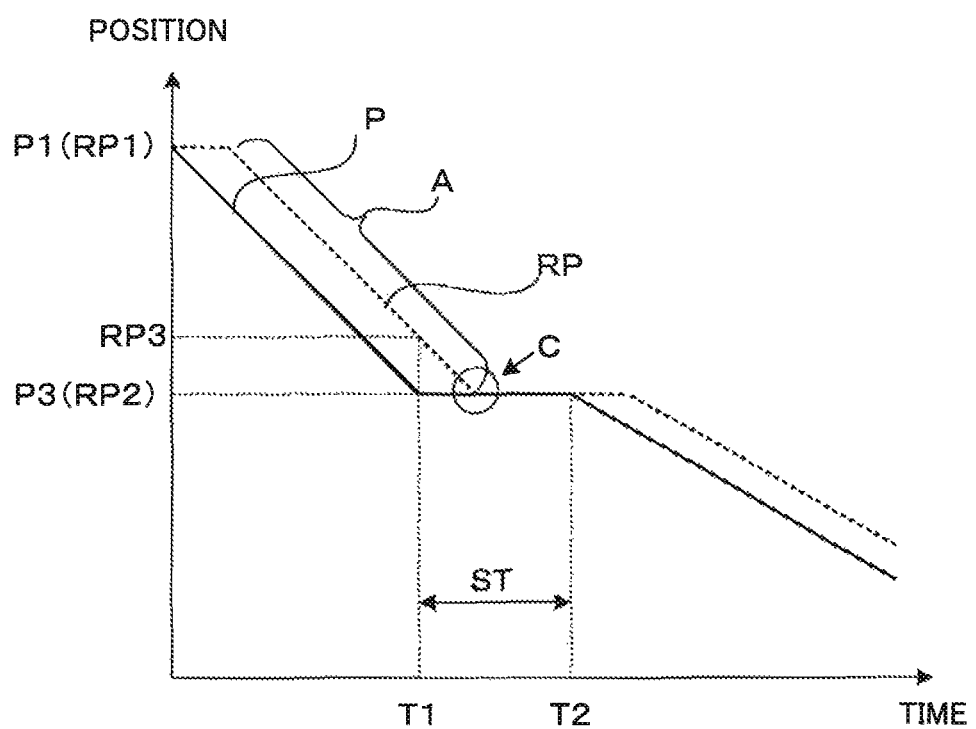
FIG. 3 is an explanatory diagram illustrating the relationship between the respective positions of a screw (or plunger) and the leading flow end of a molten resin in an injection operation according to one embodiment of the present invention.

FIG. 3 is an explanatory diagram illustrating the relationship between the respective positions of a screw and the leading flow end of a molten resin during an injection operation according to one embodiment of the present invention. In FIG. 3, the abscissa represents time, and the ordinate represents the position of the leading flow end of the molten resin along a resin distribution channel in a runner. Symbol P denotes the screw position; RP, the position of the leading flow end of the molten resin along the resin distribution channel in the runner; P1, a screw position at the start of injection; and RP1, a position of the leading flow end of the resin at an injection starting position. Symbol P3 denotes a screw advance stop position; T1, a screw advance stop time; T2, a screw advance restart time; and ST, a screw advance stop period. Symbol RP2 denotes a position where the leading flow end position RP of the molten resin that fills the runner reaches a gate portion, and RP3 denotes a position where the leading flow end position RP of the molten resin reaches just short of the gate portion. Symbol A represents a section where the molten resin is flowing into a runner portion.

A control method for an injection molding machine in an injection process according to the embodiment will now be described with reference to the explanatory diagram of FIG. 3.

At the start of injection, the screw starts to advance at the injection starting position P1. The starting point of a screw stroke is set on the tip side of a heating cylinder. On the other hand, the resin in the runner starts to move with a delay after the action of the screw, due to its elasticity and the like. Accordingly, the leading flow end (position RP) of the molten resin starts to move with a slight delay and flows into the runner that serves as the resin distribution channel, as indicated by the section A. At the time T1 when the leading flow end position RP of the molten resin reaches the position RP3 just short of the gate portion, the screw is stopped from advancing and held in position. Symbol P3 represents the screw position at this time T1. When the started screw advance is stopped at the time T1, the screw position is at P3, and the leading flow end position RP of the molten resin in the runner is then at the position RP3 just short of the gate portion. While the screw is advancing, an injection pressure is applied to the molten resin so that the resin is compressed. If the screw advance is stopped so that the application of the injection pressure is suspended, the volume of the molten resin increases. Although the screw is stopped, therefore, the leading flow end position RP of the molten resin moves and reaches the gate portion, as indicated by symbol C in FIG. 3. After the passage of the set screw advance stop period ST, thereafter, the screw advance is resumed for an injection operation.

Thus, even when the screw advance is started, according to the present embodiment, it is stopped and held for the set screw advance stop period ST at the time T1 when the leading flow end of the molten resin reaches the position RP3 just short of the gate portion, that is, the screw advance stop position P3. While the screw movement is stopped, the molten resin expands so that its volume increases and its leading flow end reaches the gate portion position RP2. Accordingly, the molten resin does not flow rapidly into the cavities or the production sections, so that the occurrence of molding failures, such as flow marks, jetting, etc., can be prevented.

The following is a description of a method of obtaining the screw advance stop position P3 where the leading flow end position RP of the molten resin reaches the position RP3 just short of the gate portion.

The screw advance stop position P3 is obtained by a so-called short-shot method, that is, a molding method in which a molded product is taken out of a mold without resuming the screw advance afterward. According to this method, the screw advance stop position P3 where the molten resin reaches the position RP3 just short of the gate portion can be obtained by carrying out the following processes.

Process 1: The injection operation is started by advancing the screw from the injection starting position.

Process 2: The application of the injection pressure to the resin is suspended at the moment when the advance of the screw is stopped. The application of the injection pressure to the resin can be suspended by, for example, retracting the screw by a predetermined amount.

Process 3: The resin is cooled and the mold is opened.

Process 4: The molded product is taken out of the mold, and it is visually checked whether or not the position RP3 just short of the gate portion is reached by the leading flow end of the resin.

Process 5: The screw advance stop position in the process 2 is adjusted and changed as the processes 1 to 4 are repeated, and a molded product is obtained such that the position RP3 just short of the gate portion is reached by the leading flow end of the resin. The screw advance stop position in the process 2 reached when the molded product is molded is assumed to be a provisional screw advance stop position P3, that is, the position P3 in FIG. 3.

Process 6: The injection operation is started by advancing the screw from the injection starting position, and the screw is advanced to and stopped at the provisional screw advance stop position P3.

Process 7: The screw is stopped from moving and held in position for a predetermined period.

Process 8: The application of the injection pressure to the resin is suspended. This can be done by, for example, retracting the screw by a predetermined amount.

Process 9: The resin is cooled and the mold is opened.

Process 10: The molded product is taken out of the mold, and it is visually checked whether or not the gate portion, that is, the position RP2 in FIG. 3, is reached by the leading flow end of the resin.

Process 11: The predetermined period in the process 7 is adjusted and changed as the processes 6 to 10 are repeated, and a molded product is obtained such that the gate portion position RP2 is reached by the leading flow end of the resin. The predetermined period set in the process 2 when the product is molded is assumed to be the screw advance stop period ST. If the leading flow end of the resin does not reach the gate portion position RP2 after the processes 6 to 11 are carried out and if the position of the leading flow end of the resin does not change even though the screw advance stop period ST is extended, however, it implies that the provisional screw advance stop position P3 obtained in the processes 1 to 5 is inappropriate. Therefore, the screw advance stop position P3 is considered to be somewhat advanced. In this case, the processes 1 to 11 are carried out again. In the processes 1 to 5, the screw advance stop position where the leading flow end of the resin reaches the position RP3 just short of the gate portion is obtained by slightly advancing the screw stop position. In the processes 6 to 11, moreover, the screw advance stop position P3 and the screw advance stop period ST are obtained such that the gate portion position RP2 is reached by the leading flow end of the resin in the obtained screw advance stop position.

If the resin is flowing into the cavities after the processes 6 to 11 are carried out, furthermore, it implies that the provisional screw advance stop position P3 obtained in the processes 1 to 5 is too close to the gate portion. Therefore, the screw advance stop position P3 and the screw advance stop period ST are obtained by carrying out the processes 1 to 11 with the screw advance stop position P3 slightly retracted.

In the processes 1 to 5, the screw is advanced up to the screw advance stop position P3, and the application of the injection pressure is suspended so that the screw is retracted at the moment when the movement is stopped. In this way, the leading flow end of the resin is allowed to reach the position RP3 just short of the gate portion. After the screw is advanced up to the screw advance stop position P3 and stopped, in the processes 6 to 11, on the other hand, it is stopped and held for the predetermined period without suspending the application of the injection pressure, that is, without being retracted. Even though the screw advance stop position P3 is not changed, the position of the leading flow end of the resin varies depending on whether or not to suspend the application of the injection pressure, that is, whether or not to retract the screw. When the application of the injection pressure is suspended, the leading flow end of the resin does not reach the gate portion. When the injection pressure is being applied, the screw advance stop position P3 is obtained such that the leading flow end of the resin reaches the gate portion. When the injection pressure is being applied although the screw is stopped from advancing, the leading flow end of the resin is moved by expansion from the position just short of the gate portion to the gate portion. By doing this, the molten resin can be released from compression and the resin can be prevented from flowing rapidly into the cavities or the production sections.

The operation in the injection process is controlled based on the screw advance stop position P3 and the screw advance stop period ST obtained in this manner. The screw is first advanced to start the injection operation and the screw advance is stopped and held at the set screw advance stop position P3. After the passage of the set screw advance stop period ST, the screw advance is resumed, and the normal injection operation is performed thereafter. If the screw advance to be resumed is difficult, it is determined that the leading flow end of the resin having reached the gate portion is solidified. In this case, an adjustment is made such that the screw advance stop period ST is reduced. The injection operation is performed as the screw advance stop period ST is reduced, and the screw advance stop period ST is obtained such that the screw advance can be resumed without difficulty after it is stopped for the set period.

In the present embodiment, the screw advance stop period ST is obtained by carrying out the processes 6 to 11. Since a rough idea of the screw stop period can be obtained from the properties of the resin, however, the screw stop period is set to a predetermined value, the process 11 is skipped, and it is checked in the process 10 whether or not the gate portion is reached by the leading flow end of the resin. If the gate portion is not reached, the screw advance stop position is changed to a slightly advanced position or the like and the processes 1 to 10 are performed. When the screw advance is stopped, the leading flow end of the resin is located just short of the gate portion. While the screw is stopped from advancing, the screw advance stop position is obtained such that the gate portion is reached by the leading flow end of the resin.

In molding a regular molded product, the injection operation is controlled based on the screw advance stop position P3 and the screw advance stop period ST obtained in this manner. Thus, in the injection process, the screw movement is stopped and held at the set screw advance stop position P3. After the passage of the set screw advance stop period ST, the screw advance is started, and the normal injection operation control is performed.

The invention claimed is:

1. A control method for an injection molding machine, the control method comprising:
   obtaining a screw or plunger stop position as a position
      where a leading flow end of a resin does not reach a gate portion, when an application of an injection pressure is suspended at the moment when the screw or the plunger is stopped after being advanced from an injection starting position, and
      where the leading flow end of the resin reaches the gate portion, when the screw or the plunger is advanced from the injection starting position to the stopped position and the application of the injection pressure is suspended after retention for a predetermined period; and
   in an injection process in which the screw or the plunger is advanced to inject the resin, which is a molten resin, into a mold, the control method further comprising:
   stopping the advance of the screw or the plunger at the screw or plunger stop position and holding for a predetermined period; and
   resuming the advance of the screw or the plunger for an injection operation.

2. The control method according to claim 1, wherein the predetermined period, during which the advance of the screw or the plunger is stopped and held, is adjusted in obtaining the position where the leading flow end of the resin reaches the gate portion, and the predetermined period is obtained as a period in which the leading flow end of the resin reaches the gate portion and the resin is not solidified.

* * * * *